(No Model.) 3 Sheets—Sheet 1.
M. HEFTLER & G. BENARD.
PROCESS OF AND APPARATUS FOR MAKING EXTRACTS.
No. 503,237. Patented Aug. 15, 1893.

Attest:
Reeve Lewis
G. M. Copenhaver

Inventors:
Maurice Heftler
Georges Benard
by their attorneys

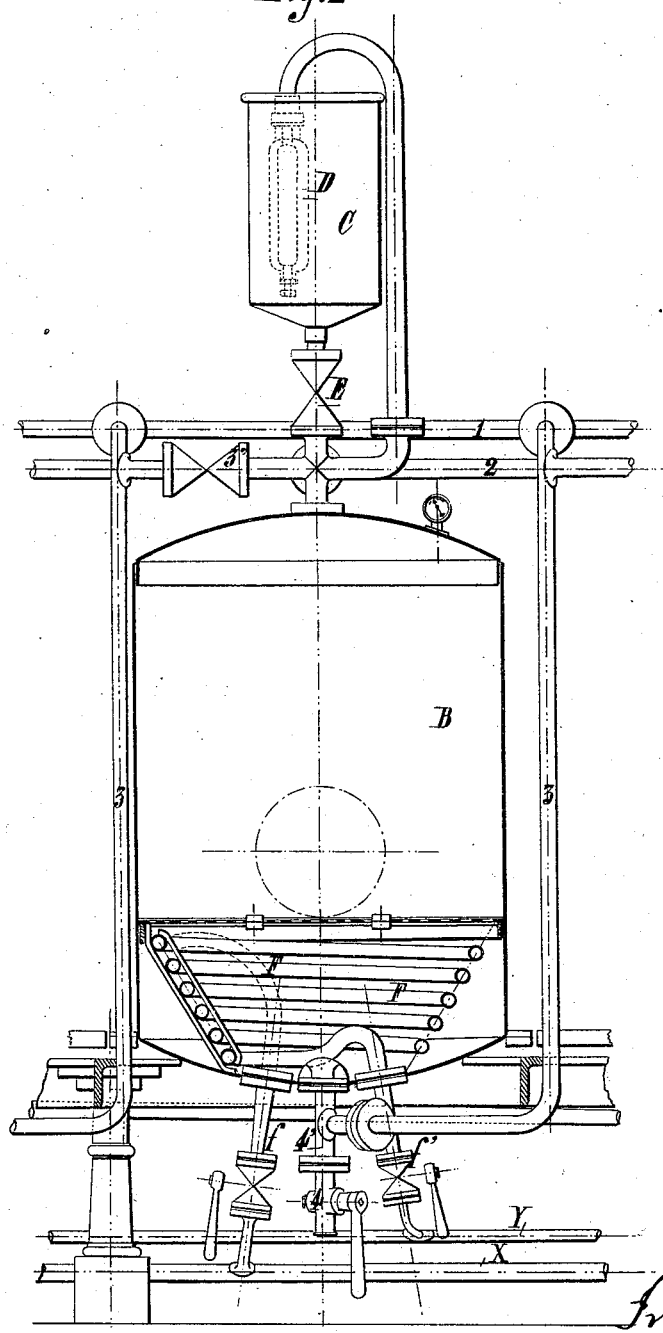

UNITED STATES PATENT OFFICE.

MAURICE HEFTLER AND GEORGES BENARD, OF PARIS, FRANCE.

PROCESS OF AND APPARATUS FOR MAKING EXTRACTS.

SPECIFICATION forming part of Letters Patent No. 503,237, dated August 15, 1893.

Application filed January 12, 1893. Serial No. 458,160½. (No model.) Patented in France May 17, 1892, No. 221,712; in Belgium November 9, 1892, No. 102,086; in Germany November 11, 1892, No. 25,503; in England November 15, 1892, No. 20,677; in Switzerland November 22, 1892, No. 6,484, and in Austria-Hungary March 28, 1893, No. 57,780 and No. 86,552.

*To all whom it may concern:*

Be it known that we, MAURICE HEFTLER and GEORGES BENARD, both of Paris, France, have invented certain new and useful Improvements in Apparatus for the Methodical Extraction of Tanning and Coloring Matters, (for which we have obtained Letters Patent in France, No. 221,712, dated May 17, 1892, and addition July 28, 1892; in Belgium November 9, 1892, No. 102,086; in Germany, No. 25,503, dated November 11, 1892; in Switzerland, No. 6,484, dated November 22, 1892; in England, No. 20,677, dated November 15, 1892, and in Austria-Hungary, No. 57,780 and No. 86,552, dated March 25, 1893,) which is fully set forth in the following specification.

This invention relates to apparatus intended to effect the methodical or progressive extraction, at either high or low temperature, of tanning or dyeing substances, leaving for residues only the woody fibers, completely exhausted.

We will describe our invention as applied to an apparatus shown in the accompanying drawings, in which—

Figure 1:
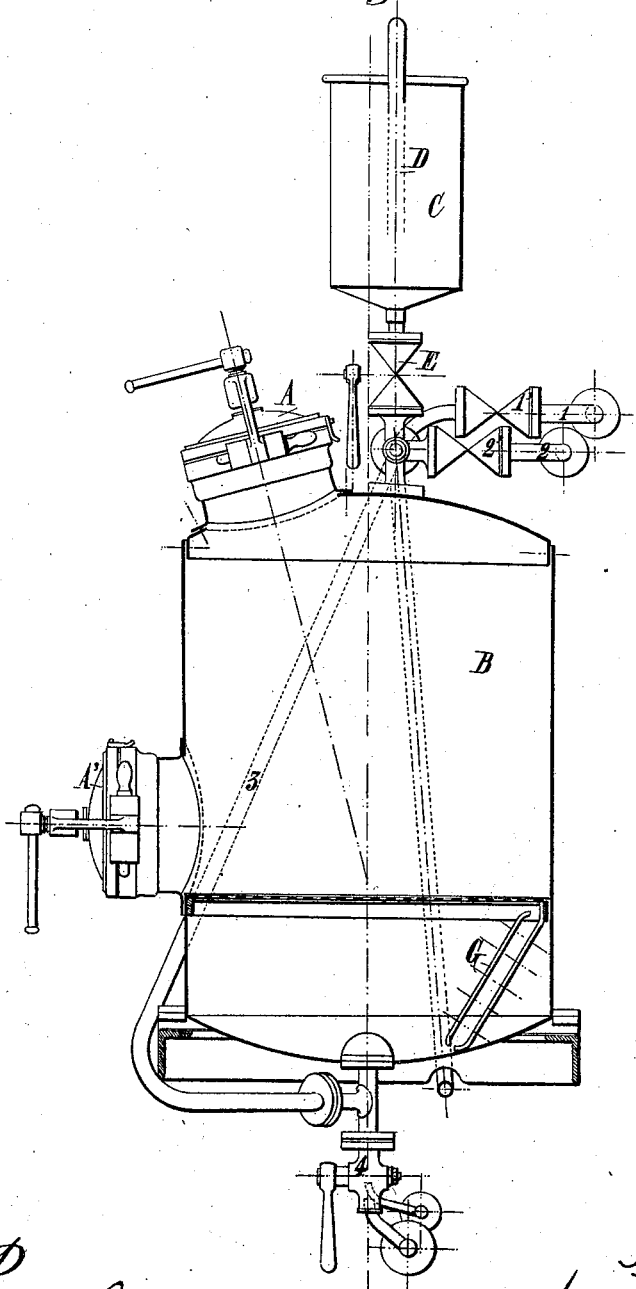
Figure 5:
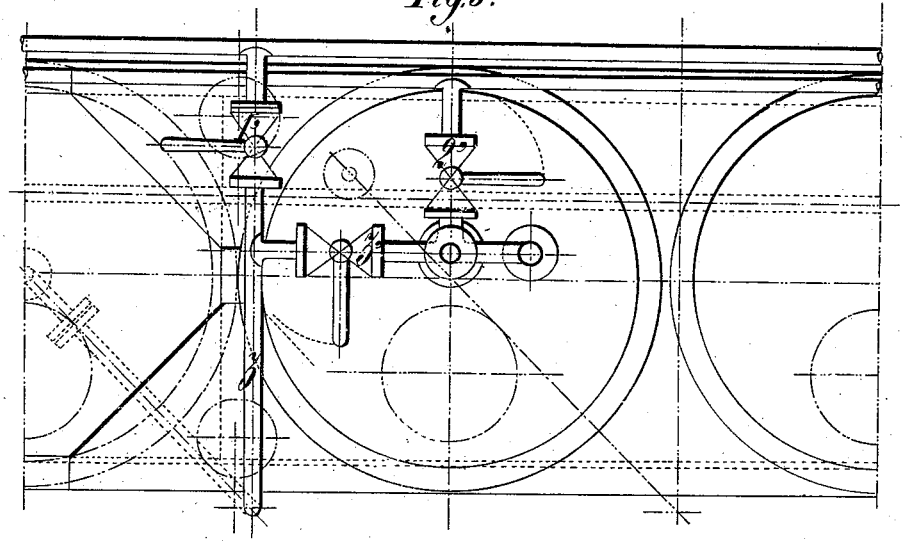

Figures 1 and 2 are elevations partly in section, showing one apparatus or extractor designed to be connected with others of the same construction, in a series or battery, and Fig. 3 is a diagrammatical plan view of the same.

Before describing the apparatus itself we will briefly indicate the principle or mode of operation involved.

We will assume that the complete exhaustion is effected in four extractors. These will be full of wood and the first alone will at the outset contain the water. The first period is that during which the temperature in the extractor is raised to 100° centigrade. Water under pressure is then admitted into vessel No. 1 so as to drive into No. 2 the liquid containing the juices extracted during the first boiling. After the first period therefore, vessel No. 1 contains wood that has been once treated, and pure water, whereas vessel No. 2 contains fresh wood and water that have been subjected to one boiling. The liquids now contained in the first and second extractors are raised to 100° centigrade. Water under pressure is then admitted into the first vessel which is put into communication with the second, the latter being put into communication with the third of the series. When the circulation of the liquid is thus established, we have reached the end of the second period and will have in vessel No. 1 pure water and wood or stock that have been twice treated, in vessel No. 2 water that has been subjected to one boiling, and stock that has been treated once. In vessel No. 3 we will have water twice boiled, and fresh wood. The operation is continued in the same way for the third period, at the end of which the first vessel which contains wood treated three times is cut off from the battery, while Nos. 2, 3 and 4 are still in operation. Vessel No. 1 is then charged with fresh wood or stock, and is replaced in battery and vessel No. 2 is cut off, and so on.

Having thus indicated in a general way our method of extraction, we will now describe the particular arrangement of apparatus. The charging of the tanning or dyeing substance is effected through the manhole A, closed by the usual means during the operation. The discharge is effected through the manhole A' in the side and lower portion of the boiler or vessel, a short distance above the grating A'', which supports the material treated. C is an expansion tank, which receives the liquid that passes either through the valve D, when the pressure in one of the vessels is too great, or through a cock E, which for this purpose is allowed to remain open, so that when boiling begins the liquid may rise into the tank C and return when boiling ceases. The cock E also has for its object to allow the boiling to take place at the atmospheric pressure. Each boiler is heated by a steam jacket, or by a steam coil F, beneath the grating A''. The steam is admitted through the lower pipe X by branch pipe $f$ which conveys the steam to the upper part of the coil, and issues through pipe $f'$, which is connected with the return pipe Y. Pipe 1 is the discharge pipe of the concentrated solution, and is connected with the boiler through cock 1'. 2 is a water-pipe which communicates with the boiler through a cock 2'. Each boiler is put in communication with the preceding one by a pipe 3, provided with a cock 3' and a cock 4, placed on pipe 4' issuing from the bottom of the boiler, serves the purpose of drawing off the contents of the vessel. These explanations will enable the operation to be understood. Suppose a plant composed of four vessels, as first described, each containing wood or stock from which the fluid matters are to be extracted. To proceed with the operation, cock 2' is opened, establishing communication between the first vessel and the water supply. Cock 2' is then closed and cock f opened admitting steam into the coil F, of the first vessel, until the temperature is raised to 100° centigrade. The boiling proceeds for a certain time, and during that time valve D comes into action, when the pressure increases, that is when the liquid is expanded by the ebullition, a portion thereof is carried past the valve into the tank C, whence, after the boiling, it will pass back to the vessel through the cock E, which is opened at this moment. When the boiling is finished, the steam admission is cut off and the vessel is put in communication with the water supply pipe 2, through cock 2', and with vessel No. 2, through pipe 3. The liquid which was contained in the vessel 1, passes under the pressure of the water into vessel No. 2 and No. 1 fills with water. Thus the vessels are put successively into communication with the steam and water supply.

Having thus described our invention, what we claim, and desire to secure by Letters Patent, is—

1. The method herein described of extracting progressively dyeing or tanning liquids from stock containing them, by introducing such stock into a series of connected vessels, admitting water or liquid to the first of these vessels, boiling the same in the first vessel, opening communication between the first and second vessels, forcing liquid under pressure into the first vessel, thereby driving the liquid previously boiled therein into the second vessel, boiling the liquid in both vessels, and so continuing until all the vessels of the series are connected and in operation, then removing the first vessel from the battery and charging it with fresh stock and so on successively with each vessel of the series, substantially as described.

2. The described apparatus for extracting dyes, tanning liquors and the like, said apparatus comprising a group of extractors or vessels connected in series, that is, the discharge pipe of one being connected to the admission orifice of the next, and being also connected with the common discharge pipe for the concentrated solution, a water supply pipe branching to each extractor, and an expansion chamber, valve and cock for each extractor, all arranged substantially as and for the purpose set forth.

In testimony whereof we have signed this specification in the presence of two subscribing witnesses.

MAURICE HEFTLER.
GEORGES BENARD.

Witnesses:
JOSEPH LACOSTE,
ROBT. M. HOOPER.